(12) United States Patent
Besson

(10) Patent No.: US 8,028,571 B2
(45) Date of Patent: Oct. 4, 2011

(54) METHOD AND APPARATUS FOR PRESSURE MEASUREMENTS IN WELL TESTING

(75) Inventor: Christian Besson, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 383 days.

(21) Appl. No.: 12/444,857

(22) PCT Filed: Oct. 9, 2007

(86) PCT No.: PCT/EP2007/060731
§ 371 (c)(1),
(2), (4) Date: Apr. 9, 2009

(87) PCT Pub. No.: WO2008/043769
PCT Pub. Date: Apr. 17, 2008

(65) Prior Publication Data
US 2010/0095759 A1    Apr. 22, 2010

(30) Foreign Application Priority Data
Oct. 9, 2006 (EP) .................................. 06291587

(51) Int. Cl.
*E21B 47/06* (2006.01)
(52) U.S. Cl. .................................................. 73/152.51
(58) Field of Classification Search .................. None
See application file for complete search history.

(56) References Cited

U.S. PATENT DOCUMENTS

| | | |
|---|---|---|
| 3,350,932 A | 11/1967 | Kirby |
| 4,507,971 A | 4/1985 | Vachek |
| 4,712,430 A | 12/1987 | Wareham |
| 5,509,312 A | 4/1996 | Donzier |
| 6,158,271 A * | 12/2000 | de Corral ............ 73/54.05 |
| 6,276,195 B1 * | 8/2001 | de Corral ............ 73/54.05 |

FOREIGN PATENT DOCUMENTS
GB    1131892    10/1968

OTHER PUBLICATIONS

Dirk De Bruyker and Robert Puers : "experimental characterization of the reference channel of a differential pressure sensor using pressure shock waves" Journal of Micromechanics and Microengineering vol. 11, No. 4, Jul. 2001, pp. 390-396, XP002421815.

(Continued)

*Primary Examiner* — Andre Allen
(74) *Attorney, Agent, or Firm* — Myron Stout; George Georgellis; Jeffrey E. Griffin

(57) ABSTRACT

Apparatus and method for determining pressure in a well is provided. A sensor for determining the rate of change of pressure in a well comprises: a first cavity body defining an enclosed volume, a portion of one wall of the cavity body being constituted by a pressure sensitive membrane capable of exposure to the well pressure so as to be responsive thereto; and a first capillary connected to the first cavity body at one end and being open to the well pressure at the other end so as to provide pressure communication between the well pressure and the interior of the first cavity body; wherein a length of the first capillary, an internal diameter of the first capillary, and the volume of the first cavity body are such that the sensor has a predetermined pressure response that comprises an input minus a low-pass filtered version of the input, and a predetermined time constant.

15 Claims, 1 Drawing Sheet

OTHER PUBLICATIONS

Charles Cox et al "a deep-sea differential pressure gauge" Journal of Atmospheric and Oceanic Technology, vol. 1, Sep. 1984, pp. 237-246, XP008075609.

Arthur S. Iberall : "Attenuation of Oscillatory Pressures in Instrument lines" Journal of Research of the National Bureau of Standards, vol. 45, Jul. 1950, pp. 85-108, XP008075608.

* cited by examiner

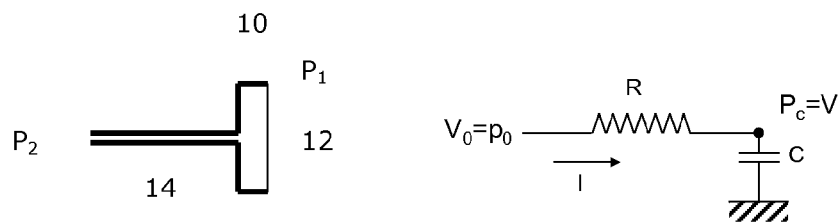
Fig. 1
Fig. 2
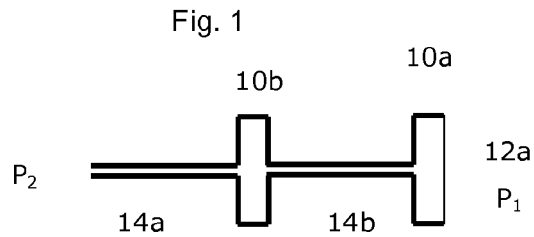
Fig. 3
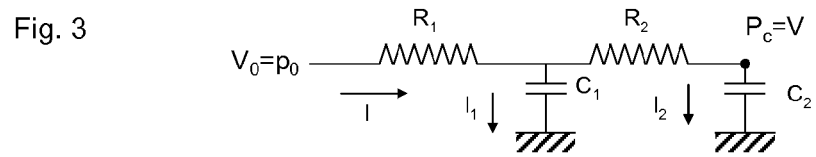
Fig. 4

METHOD AND APPARATUS FOR PRESSURE MEASUREMENTS IN WELL TESTING

TECHNICAL FIELD

The invention relates to methods and apparatus for making pressure measurements in wells. In particular, the invention relates to such methods and apparatus for use in determination of the rate of change of pressure and or absolute pressure in the course of evaluating oil or gas wells.

BACKGROUND ART

Following the drilling of wells such as oil or gas wells, it is desirable to characterize the formations surrounding the well in order that the appropriate measures can be taken to obtain optimum production from the well without causing damage to the formations and preventing effective recovery of the useful reserves. Properties such as permeability (horizontal, spherical, vertical, etc.), skin (the extent of damage to the formation around the well, typically arising from the drilling and well completion processes), and the limits of the producing formations are some of the properties typically used for such characterization. One tool used to make measurements to allow these properties to be determined is the MDT tool of Schlumberger. The MDT tool includes a highly accurate pressure gauge, the CQG, to enable measurements to be made of the fluid pressure in the formation around the well or in isolated intervals of the well. One well test that is possible with such a tool is the mini-DST in which fluid is drawn from an interval of the well isolated by means of a pair of inflatable packers and the pressure in the interval monitored as fluids flow from the formation into the interval. The pressure difference is measured over time and the pressure derivative, the rate of change of pressure over time determined. From these measurements, the properties of the formations can be determined. Examples of mini-DSTs can be found in *The MDT Tool: A Wireline Testing Breakthrough*, Schlumberger Oilfield Review, April 1992, 58-65; and *Characterizing Permeability with Formation Testers*, Schlumberger Oilfield Review, Autumn 2001, 2-23.

The fundamental challenge in downhole pressure gauge design is to provide something which is mechanically very strong so as to be able to withstand high static and dynamic stresses, but at the same very sensitive to small pressure changes (for accuracy and resolution), which implies mechanically weak. In high-end gauges such as CQG, there can be a dynamic range of more than $10^6$ between the gauge pressure rating (e.g. 137895 kPa (20000 psi)) and the gauge resolution (e.g. 69Pa (0.01 psi)). Sensors with such a large dynamic range are difficult to design and manufacture.

However, if the way in which the data is used is considered, high resolution is not normally needed at the same time as high accuracy. For example, the resolution is used at the end of build-ups in well testing but there is no need to determine reservoir pressure to within 69 Pa (0.01 psi). The high resolution measurement is used to compute (and process and interpret) the derivative of the pressure signal.

This invention is based on the use of a pressure sensor that directly measures the derivative of the pressure. This can be achieved much more simply and at much lower cost than conventional high end pressure sensors.

A differential pressure gauge is described in *A Deep-Sea Differential Pressure Gauge*, Cox, C. et al, Journal of Atmospheric and Oceanic Technology Vol. 1, September 1984, 237-246. This document proposes a pressure sensor for use in sea-bed conditions to measure pressures generated by long ocean surface gravity waves, seismic disturbances of the seabed, microseisms, and the low-frequency end of the ocean acoustic spectrum, at frequencies in the range $10^2$-$10^{-4}$ Hz and at pressures of $10^5$-$10^{-5}$ Pa$^2$/Hz, with a seabed pressure of $4\times10^7$ Pa.

U.S. Pat. No. 4,507,971 describes an apparatus for measuring pressure. The apparatus comprises a hydraulic filter having a capillary tube as a resistor to eliminate slow pressure fluctuations.

SUMMARY OF THE DISCLOSURE

Accordingly an exemplary aspect of the invention, there is provided a sensor for determining the rate of change of pressure in a well, comprising: a first cavity body defining an enclosed volume, at least part of one wall of the cavity body being constituted by a pressure sensitive membrane which, in use, is exposed to the well pressure so as to be responsive to input pressure changes therein; and a first capillary connected to the first cavity body at one end and being open to the well pressure at the other end so as to provide pressure communication between the well pressure and the interior of the first cavity body and to dampen the response of the membrane to the input pressure changes; wherein the first cavity body and first capillary have physical characteristics (i.e. length of the first capillary, internal diameter of the first capillary, and volume of the first cavity body) such that the sensor has a predetermined pressure response that comprises the input minus a low-pass filtered version of the input, and a predetermined time constant.

By exposing both sides of the membrane to well pressure but arranging one side to be exposed via the capillary, the response of the membrane corresponds to the changing well pressure with a time constant imposed by the mechanical filter effect of the capillary.

Further aspects of the sensor that can be configured to obtain the desired response include the viscosity and the compressibility of the fluid used to fill the cavity and capillary.

Another embodiment of the sensor according to the invention comprises a second cavity body and a second capillary connected to the first cavity body, so as to provide a different frequency response.

The second cavity body can connected to the first cavity body by means of the second capillary; the first capillary being connected to the second cavity body. Alternatively, the second cavity body can be positioned on the opposite side of the pressure sensitive membrane to the first cavity body and the second capillary is connected to the second cavity body so as to provide pressure communication between the well pressure and the interior of the second cavity body.

Another aspect of the invention comprises a method for using the sensor as defined above to determine the rate of change of pressure in a well during a well test. Such method comprises measuring the response of the pressure sensitive membrane over the duration of the well test; determining the time constant of the sensor used to make the measurements of the response of the pressure sensitive membrane; and determining the rate of change of the pressure in the well from the response of the pressure sensitive membrane and the time constant of the sensor.

Preferably, the method comprises exposing the pressure sensitive membrane and the open end of the first capillary to the same region of the well in which the rate of change is determined.

The determined rate of change of pressure can be used to provide measurements of permeability, skin and/or reservoir boundaries in the formation around the well.

A further aspect of the invention comprises an apparatus for making pressure measurements in a well, comprising an array having at least two embodiments of the sensor defined above, each of the sensors having different time constants.

An even further aspect of the invention comprises a method of determining the absolute pressure in a formation surrounding a well during a well test using an apparatus as defined above. The method comprising integrating the rate of change of well pressure determined by the different sensors over the duration of the well test to obtain the absolute pressure of the formation surrounding the well. The method may further comprise measuring the responses of the pressure sensitive membranes over the duration of the well test; determining the time constants of the sensors used to make the measurements; determining the rate of change of the well pressure from the responses of the pressure sensitive membranes and the time constants of the sensors.

Other embodiments and preferred and alternative features of the invention are described in relation to the drawings below.

BRIEF DESCRIPTION OF THE DRAWINGS

To assist those of ordinary skill in the relevant art in making and using the subject matter hereof, reference is made to the appended drawings, in which like reference numerals refer to similar elements:

FIGS. 1 and 2 show a first embodiment of the invention and its equivalent electrical circuit; and FIGS. 3 and 4 show another embodiment of the invention and its equivalent electrical circuit.

DESCRIPTION OF EXEMPLARY EMBODIMENTS

FIG. 1 shows schematically the basic concept of the invention. A cavity body 10 has part of a wall constituted by a pressure sensitive membrane 12 (as found in many types of absolute or differential pressure sensors used in oilfield applications), the outside of which is exposed $P_1$ to a pressure to be measured. The cavity is fluid-filled and connected to a long narrow capillary tube 14. The end of the capillary tube 14 is also exposed $P_2$ to the pressure to be measured, and so therefore, is the inside of the membrane (so P1 and P2 in the drawing are the same pressures and equal to the pressure to be measured).

Simple modifications of the theory set forth in *Attenuation of Oscillatory Pressures in Instrument Lines*, Arthur S. Iberall, Journal of Research of National Bureau of Standards, RP2115, Volume 45, (1950) and *Experimental characterization of the reference channel of a differential pressure sensor using pressure shock waves*, Dirk De Bruyker and Robert Puers, Journal of Micromechanics and Microengineering, 11 (2001) 390 show that with suitable choice of the geometrical dimensions of the cavity and the capillary tube, this "differential pressure transducer" (of which both ports are exposed to the same pressure) responds to the time derivative of the ambient pressure, computed with a time constant that depends on the geometrical parameters of the design. The details of the calculations given below show that a sensor to have a time constant on the order of 1 second can be produced, which is suitable for analysis of build-up tests in well testing. Of course for different applications, one can design with different time constants as appropriate.

The effect used in this invention is discussed in the De Bruyker et al reference which shows that a capillary tube coupled to a differential pressure transducer responds to the derivative of the pressure signal.

For a differential pressure sensor of the type shown in FIG. 1, the membrane 12 is exposed on one side to a directly applied pressure $P_1$; on the other side, there is an enclosed volume V connected to pressure $P_2$ by a capillary tube. Models of this system are given by versions of those set forth in the Iberall and De Bruyker et al references slightly generalized to include the effect of the flexibility of the membrane.

These models include certain assumptions:

The fluid in the capillary 14 can be considered as incompressible. This assumption can be relaxed as shown in the Iberall reference, but here it is maintained to keep the analysis simple. It is a good approximation as long as the volume of fluid in the capillary is much smaller than the volume of fluid in the cavity V.

The fluid in the cavity is compressible; this gives a non-trivial frequency response. If needed to achieve the desired frequency response, the compressibility of the fluid in the cavity can be increased, for example by introducing a small gas bubble.

The pressure in the cavity is uniform.

Poiseuille flow is assumed in the capillary (more complex models can be used, but the Poiseuille flow assumption captures the basic physics of attenuation by viscous dissipation that is the basis for the non-trivial frequency response). A circular capillary of diameter D and length L is also assumed, although other channel shapes can be handled through hydraulic diameter approximation or more complex flow models. The pressure drop along the capillary is linked to the flow rate Q through it by:

$$\frac{\partial P}{\partial x} = -\frac{128}{\pi}\frac{\mu}{D^4}Q = -\alpha \cdot Q \tag{1}$$

where $\mu$ is the viscosity of the fluid in the capillary. For illustration, we will take $\mu$ to be about 1 centiPoise, i.e. $10^{-3}$ Pa-s.

For negligible compressibility of the fluid in the capillary, the flow rate is constant along the length x of the capillary:

$$\frac{\partial Q}{\partial x} = 0 \tag{2}$$

and therefore $$\frac{\partial^2 P}{\partial x^2} = 0$$

With the boundary conditions that, at x=0:

$$P(0,t)=P2\,(t) \tag{3}$$

At x=L (where the capillary joins with the cavity), the flow rate Q is linked to the change in volume $V_f$ of the fluid in the cavity:

$$Q = \frac{\partial V_f}{\partial t} \tag{4}$$

The change in $V_f$ has two parts: one coming from the compressibility of the fluid in the cavity, and the other from the change in volume of the cavity due to the flexion of the membrane:

$$\frac{\partial V_f}{\partial t} = Vc\frac{\partial P_c}{\partial t} + Vk\frac{\partial (P_c - P_1)}{\partial t} \qquad (5)$$

where $P_c$ is the pressure in the cavity (equal to the pressure in the capillary at x=L), c is the compressibility of the fluid in the cavity; the range of relevant values is from $5\ 10^{-10}\ Pa^{-1}$ (water compressibility) to $10^{-8}\ Pa^{-1}$ (ideal gas bubble at 100 bars occupying one tenth of the volume of the cavity).

$$k = \frac{1}{V}\frac{\partial V}{\partial P}$$

gives the change in volume of the cavity when the membrane is flexed by the pressure differential across its face; k depends on the membrane stiffness, and the geometrical dimensions of the cavity. It is assumed that the membrane flexes linearly with pressure, i.e. neglecting the dynamics of the membrane. This is an appropriate assumption because membranes in pressure sensors formed as MEMS devices (the preferred form of the invention) typically have their resonance frequencies much higher than the frequency range of interest here.

There are three cases to consider:
a. $P_1$=constant; $P_2=P_0+p_0 e^{i\omega t}$
b. $P_2$=constant; $P_1=P_0+p_0 e^{i\omega t}$
c. $P_1=P_2=P_0+p_0 e^{i\omega t}$ Case c is directly relevant to the invention, cases a and b being considered to help in understanding the physics of the frequency response.

In cases a and c, a solution is sought for the pressure P(x,t) in the capillary in the form $P(x,t)=P_0+p(x)\ e^{i\omega t}$; in case b, in the form $P(x,t)=P_2+p(x)\ e^{i\omega t}$.

Equation (2) becomes:

$$\frac{d^2 p}{dx^2} = 0,$$

i.e. p=ax+b, and a and b are determined by the boundary conditions (3) and (4), together with equations (1) and (5).

One obtains for the output of the sensor, $DP=P_1-P_c$.

For case a:

$$DP = P_1 - P_0 - p_0 \frac{1}{1+i\omega\cdot\tau} e^{i\omega t} \qquad (6)$$

where $$\tau = \frac{128}{\pi}\frac{\mu}{D^4}VL(c+k)$$

The time variations of pressure on the capillary side are low-passed filtered, with cut-off $1/\tau$. The physics is relatively simple: the compressibility of fluid in the cavity, as well as changes of volume of the cavity due to flexing of the membrane, draw fluid in and out of the capillary; fast flows in the capillary are dumped by viscosity.

For case b:

$$DP = P_0 - P_2 - p_0 \frac{1+i\omega\cdot\tau'}{1+i\omega\cdot\tau} e^{i\omega t} \qquad (7)$$

where $$\tau' = \frac{128}{\pi}\frac{\mu}{D^4}VLc$$

Here it is required to have k non-zero for the variations of pressure on one side to induce changes of volume of the cavity, and attenuation.

For case c:

$$DP = p_0 \frac{i\omega\cdot\tau'}{1+i\omega\cdot\tau}e^{i\omega t} = p_0\frac{\tau'}{\tau}\left(1 - \frac{1}{1+i\omega\cdot\tau}\right)e^{i\omega t} \qquad (8)$$

This shows the sensor response to be equal to the input minus a low passed filtered version of the input. This is a good approximation of the time derivative of the input signal (taken over a time interval $\tau$). The fluid in the cavity has to be sufficiently compressible (compared to the volume changes due to flexing of the membrane) so that the factor $\tau'/\tau$ does not reduce the signal amplitude significantly. This can always be arranged by having the cavity volume sufficiently large.

To be useful for well testing applications, the time constant needs to be on the order of one second. One embodiment of a sensor that gives such a time constant $\tau\cong 1$ sec has the following dimensions and parameters:

$\mu=10^{-3}$ Pa-s (viscosity of water; one can easily use a fluid with higher viscosity), D=3 $\mu$m=3 $10^{-6}$ m (possible with micro-fabrication etching techniques for the construction of MEMs devices), L=20 mm=2 $10^{-2}$ m (the capillary can meander to have a significant length in a small area), V=$10^{-10}$ m$^3$ (for example 1 mm by 1 mm by 100 microns; dimensions currently found in MEMS pressure sensors). The volume of the capillary is on the order of $10^{-13}$, much smaller than V, so that neglecting compressibility in the capillary is justified, c=$10^{-9}$ Pa$^{-1}$ (an intermediate value in the relevant range), and neglect k.

Thus it is possible to design a sensor with the desired response that can be fabricated using conventional MEMs techniques. The greatest challenge is to obtain the small value of D used in the example above, but this can be relaxed increasing V, L and c (e.g. with a gas bubble).

In a different embodiment of the invention, an array of sensors as described above is used, each with a different time constant. Such an array can act as a replacement for an accurate high-end absolute pressure sensor. In principle, if one records the time derivative of the pressure versus time, one can integrate it back to obtain the absolute pressure (starting from a known value such as atmospheric pressure before running into the hole in the well testing operation). However this is generally not very accurate, as small measurement errors on the derivative accumulate as one integrates over a long time. The use of multiple sensors with different time constant allows to correct for this accumulation of errors as the integration of each sensor has to match the measurement of the next one in the hierarchy. With modern MEMS manufacturing techniques, it is straightforward to manufacture a large array of sensors with different capillary lengths and membrane thicknesses, providing a good basis for an accurate absolute pressure sensor based on this concept. It should be noted that each membrane sees only a differential pressure at most equal to the change in pressure over its characteristic time, so no membrane ever sees a differential pressure equal to the (high) absolute pressure; and each membrane needs a moderate resolution, adapted to its maximum range. Thus a difficult measurement (high resolution, high pressure range sensor) has been transformed into a large number of relatively easy measurements with limited range and limited resolution).

The embodiment described above effectively measures dp/dt directly in well testing by using a differential pressure transducer with a capillary/cavity filter on one side (or both as is described below). This is useful for interpreting the pressure derivative directly as it is much simpler to build than a conventional high resolution pressure sensor. However, it does not give absolute pressure, only pressure changes.

A second embodiment of the invention comprises using an array of such pressure derivative sensors with different time constants to reconstruct the value of absolute pressure. In this case, each sensor is substantially as described here but with different dimensions or properties to ensure that a number of time constants are provided for the multiple measurements in a given location.

Straightforward time integration of the sensor measurement can provide absolute pressure accuracy similar to existing low-end pressure gauges. With an array of just two sensors with reasonable parameters, it is also possible to achieve an accuracy comparable with the best (quartz) pressure sensors.

The frequency response of a sensor is given above in relation to case c:

$$DP = p_0 \frac{\tau'}{\tau}\left(1 - \frac{1}{1+i\omega\cdot\tau}\right)e^{i\omega t} \quad (8)$$

To simplify the expressions, the approximation $\tau'=\tau$ is used as this is not a limitation. In the time domain, this gives:

$$DP(t) = P(t) - \int_{-\infty}^{t} \frac{dt'}{\tau} P(t')e^{-(t-t')/\tau} \quad (9)$$

which shows that DP is approximately equal to the difference between P and an average of P over a time $\tau$, an approximation of the time derivative of P.

To obtain an absolute value of P, the time derivative is integrated over time (starting from an accurately known point $P_0$, such as atmospheric pressure before running in hole). One has the exact expression:

$$P(t) = P_0 + DP(t) + \frac{1}{\tau}\int_0^t dt' DP(t') \quad (10)$$

When integrating over time, errors accumulate; if $\tau$ is one second, if the error on each DP measurement is $\epsilon$ psi and the job lasts T seconds, the error on P at the end of the job will be on the order of $\epsilon\sqrt{T}$.

If it is assumed that the maximum variation of pressure in a well testing job is 6.9 kPa/sec (1 psi/sec), which is not unreasonable, then a DP sensor with 1 sec time constant will need to have a range of +/−6.9 kPa (1 psi). This is comparable to the range of the sensors used in current well production logging tools. For such sensors having a resolution on the order of 6.9 Pa (0.001 psi) and an error band on the order of 69 Pa (0.01 psi) (assumed to be a 1 sigma random error), then the error on S at the end of a job of duration $10^6$ seconds (a reasonable upper bound) will be on the order of $0.01\sqrt{10^6}$=10 psi.

This can be improved by addressing the accumulation of errors in the time integral. It is well known that a combination of a less accurate but slow, or already integrated, measurement, in addition to the accurate, fast measurement being integrated, allows correction for the accumulation of errors. A similar problem is extensively covered in the literature for guidance of vehicles where an accelerometer or inertial platform provides the fast measurement to be integrated, and GPS (or matching of landmarks with a map) provides a way to correct for accumulation of errors from time to time (GPS coverage being available only intermittently due to foliage or other obstacles). In both of these cases, well-known Kalman filter techniques have been developed to estimate and correct for the accumulation of errors.

The second embodiment of the invention comprises the use of a first sensor $DP_1$ and a second DP sensor $DP_2$ with a longer time constant to provide the "slow, more integrated" measurement that can be used to correct for error accumulation. There are now two measurements:

$$DP_1(t) = P(t) - \int_{-\infty}^{t} \frac{dt'}{\tau} P(t')e^{-(t-t')/\tau_1} \quad (11)$$

$$DP_2(t) = P(t) - \int_{-\infty}^{t} \frac{dt'}{\tau} P(t')e^{-(t-t')/\tau_2} \quad (12)$$

with $\tau_2 \gg \tau_1$, for example $\tau_1=1$ sec and $\tau_2=100$ sec, it is clear that in a sense $DP_2$ provides an "integrated" version of $DP_1$ over time $\tau_2$. This can be formalized by calculating:

$$I(t) = \int_{-\infty}^{t} \frac{dt'}{\tau_2} DP_1(t')e^{-(t-t')/\tau_2} \quad (13)$$

and showing that $$DP_2(t) = \frac{(\tau_2 - \tau_1)}{\tau_1} I(t) + DP_1(t). \quad (14)$$

The accumulated error in doing the integration to get I(t) is on the order $$\epsilon_1\sqrt{\frac{\tau_2}{\tau_1}}.$$

The $DP_2$ sensor has a range $\tau_2/\tau_1$ larger than that of the $DP_1$ sensor to cope with the same assumed maximum slope of 1 psi/sec. If it has the same ratio of accuracy to range, its error will be on the order of $$\epsilon_2 = \epsilon_1 \frac{\tau_2}{\tau_1},$$

and equation (14) can be used to reduce the accumulated error in the integration by a factor $$\sqrt{\frac{\tau_2}{\tau_1}}.$$

If $\tau_2$ is 100 seconds and $\tau_1$ is 1 second for example, the accumulated integration error after $10^6$ seconds can be reduced to be on the order of 6.9 kPa (1 psi) with two new DP sensors of 69 Pa (0.01 psi) and 6.9 kPa (1 psi) errors respectively (for range 6.9kPa (1 psi) and 690kPa (100 psi) respectively). Sensors with improved errors would lead to correspondingly improved final error on estimates of absolute P.

This argument is not a complete proof because the integrals needed for the various calculations mentioned above are not exactly equal, but they should be closely related enough that their accumulated errors are similar, so that a Kalman estimate of one can be used to correct the other. The use of more than two DP sensors with different time constants can further reduce the integration errors.

All the measurements are sensitive to temperature. Therefore, independent temperature measurements can be made to enable temperature corrections, as is done for current downhole pressure sensors.

In FIG. 1, the device has one side with cavity and capillary, while the other side is directly exposed to the outside pressure. In a third embodiment of the invention, cavities and/or capillaries can be provided on both sides of the membrane, as long as they provide different frequency responses: if the time constant of the cavity/capillary on one side is short, while the other is long, the ensemble still responds to the derivative of the pressure with a time constant equal to the longest of the two.

From the calculations shown above, it is clear that the behaviour of the device (FIG. 1) can be considered equivalent to that of the electrical circuit shown in FIG. 2, with the correspondence between pressure and voltage, and between current and flow rate.

Thus, the design can be generalized to more complex arrangements of capillaries and cavities. For example, the design of FIG. 3 with two capillaries and two cavities is equivalent to the circuit of FIG. 4. The embodiment of FIG. 3 comprises a first cavity body 10*a* having the membrane 12*a* which is connected to a second, intermediate cavity body 10*b* by means of a second capillary 14*b*. The second cavity body 10*b* is connected to the outside pressure P2 by the first capillary 14*a*.

This is now a second order filter and can be generalized to a filter of any order. With current MEMS technology, arbitrary geometries of capillaries and cavities can be easily made, so one can have a sensor that measures pressure P(t) minus a filtered version of P(t), with an arbitrary filter. This can be used for two purposes:

Providing a sensor that measures directly a better approximation of dP/dt than can be achieved with the simple design, by choosing a more sophisticated filter.

Providing an array of sensors in which each measures the same property with a different filter. With appropriate filters and a sufficiently large number of sensors, it should be possible to reconstruct P(t) with any desired accuracy. In principle, knowledge of filtered versions of a function through an infinite set of filters of order 1, 2, 3 . . . n, . . . is equivalent to knowledge of the original function. Cutting off the series at order N simply limits the accuracy on the reconstruction, with accuracy improving with increasing with N, as long as the dP/dt is bounded.

In an alternative embodiment, the two cavities can be on either side of the membrane, each cavity having its own capillary.

Other changes can be made to the sensor within the scope of the invention.

In use in a well test, a portion of the well is isolated and fluid withdrawn so that the isolated portion is below the formation pressure. As fluid flows from the formation into the isolated portion, the pressure rises until it is again balancing the formation pressure. Measuring the rate of change of pressure in the isolated portion of the well using the embodiments of the invention described above allows the formation properties to be estimated using known techniques.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

What is claimed is:

1. Sensor for determining the rate of change of pressure in a well, comprising:
    a first cavity body defining an enclosed volume, a portion of one wall of the cavity body being constituted by a pressure sensitive membrane capable of exposure to the well pressure so as to be responsive thereto;
    a first capillary connected to the first cavity body at one end and being open to the well pressure at the other end so as to provide pressure communication between the well pressure and the interior of the first cavity body; and
    wherein a length of the first capillary, an internal diameter of the first capillary, and the volume of the first cavity body are such that the sensor has a predetermined pressure response that comprises an input minus a low-pass filtered version of the input, and a predetermined time constant.

2. The sensor according to claim 1, further comprising a second cavity body and a second capillary connected to the first cavity body.

3. The sensor according to claim 2, wherein the second cavity body is connected to the first cavity body by means of the second capillary; the first capillary being connected to the second cavity body.

4. The sensor according to claim 2, wherein the second cavity body is positioned on the opposite side of the pressure sensitive membrane to the first cavity body and the second capillary is connected to the second cavity body so as to provide pressure communication between the well pressure and the interior of the second cavity body.

5. An apparatus for measuring pressure in a well, comprising:
    at least two sensors for determining the rate of change of pressure in the well, each sensor comprising:
        a first cavity body defining an enclosed volume, a portion of one wall of the cavity body being constituted by a pressure sensitive membrane capable of exposure to the well pressure so as to be responsive thereto;
        a first capillary connected to the first cavity body at one end and being open to the well pressure at the other end so as to provide pressure communication between the well pressure and the interior of the first cavity body; and
        wherein a length of the first capillary, an internal diameter of the first capillary, and the volume of the first cavity body are such that each sensor has a predetermined pressure response that comprises an input minus a low-pass filtered version of the input; and
    wherein each sensor comprises different predetermined time constants.

6. The apparatus according to claim 5, wherein each sensor further comprises a second cavity body and a second capillary connected to the first cavity body.

7. The apparatus according to claim 6, wherein the second cavity body of each sensor is connected to the first cavity body by means of the second capillary; the first capillary being connected to the second cavity body.

8. The apparatus according to claim 6, wherein the second cavity body of each sensor is positioned on the opposite side of the pressure sensitive membrane to the first cavity body and the second capillary is connected to the second cavity body so as to provide pressure communication between the well pressure and the interior of the second cavity body.

9. The apparatus of claim 5, wherein each sensor is filled with fluid.

10. The apparatus of claim 9, wherein the parameters of the fluid are selected to provide the predetermined pressure response.

11. The apparatus of claim 10, wherein the parameters of the fluid are the viscosity of the fluid and/or the compressibility of the fluid.

12. A method for determining the rate of change of pressure in a well during a well test, the method comprising the steps of:
  providing a sensor comprising:
    a first cavity body defining an enclosed volume, a portion of one wall of the cavity body being constituted by a pressure sensitive membrane capable of exposure to the well pressure so as to be responsive thereto;
    a first capillary connected to the first cavity body at one end and being open to the well pressure at the other end so as to provide pressure communication between the well pressure and the interior of the first cavity body; and
    wherein a length of the first capillary, an internal diameter of the first capillary, and the volume of the first cavity body are such that each sensor has a predetermined pressure response that comprises an input minus a low-pass filtered version of the input, and a time constant;
  measuring the response of the pressure sensitive membrane over the duration of the well test;
  determining the time constant of the sensor used to make the measurements of the response of the pressure sensitive membrane; and
  determining the rate of change of the pressure in the well from the response of the pressure sensitive membrane and the time constant of the sensor.

13. The method according to claim 12, further comprising the step of exposing the pressure sensitive membrane and the open end of the first capillary to the same region of the well in which the rate of change is determined.

14. The method according to claim 12, further comprising the step of using the determined rate of change of pressure to provide measurements of permeability, skin and/or reservoir boundaries of a formation around the well.

15. A method of determining absolute pressure in a formation surrounding a well during a well test, the method comprising the steps of:
  providing an apparatus having an array of at least two sensors, each sensor comprising:
    a first cavity body defining an enclosed volume, a portion of one wall of the cavity body being constituted by a pressure sensitive membrane capable of exposure to the well pressure so as to be responsive thereto;
    a first capillary connected to the first cavity body at one end and being open to the well pressure at the other end so as to provide pressure communication between the well pressure and the interior of the first cavity body; and
    wherein a length of the first capillary, an internal diameter of the first capillary, and the volume of the first cavity body are such that each sensor has a predetermined pressure response that comprises an input minus a low-pass filtered version of the input; and
    wherein each sensor comprises different predetermined time constants;
  integrating the rate of change of well pressure determined by each sensor over the duration of the well test to obtain the absolute pressure of the formation surrounding the well.

* * * * *